INVENTOR.
E.E. REED
BY Young & Quigg
ATTORNEYS

Oct. 12, 1965

E. E. REED 3,210,953

VOLATILE LIQUID OR LIQUEFIED GAS STORAGE, REFRIGERATION, AND
UNLOADING PROCESS AND SYSTEM

Filed Feb. 21, 1963

INVENTOR.
E. E. REED

BY *Young & Quigg*

ATTORNEYS

United States Patent Office 3,210,953
Patented Oct. 12, 1965

---

3,210,953
VOLATILE LIQUID OR LIQUEFIED GAS STORAGE, REFRIGERATION, AND UNLOADING PROCESS AND SYSTEM
Edwin E. Reed, Bartlesville, Okla., assignor to Phillips Petroleum Company, a corporation of Delaware
Filed Feb. 21, 1963, Ser. No. 260,213
12 Claims. (Cl. 62—54)

This invention relates to a process of and apparatus for storing a volatile liquid or liquefied normally-gaseous material in a refrigerated condition at a temperature substantially below atmospheric temperature and thereby at a substantially reduced pressure, by drawing off vapor from said stored liquid, compressing and condensing said vapor into condensed liquid, and returning said condensed liquid to said stored liquid, combined with a process and apparatus for discharging said stored liquid from said storage when desired. In another aspect, it relates to a process and apparatus for preventing liquid entering said compression means at any time. In another aspect, it relates to a process and apparatus whereby difficultly condensable or fixed gases may be bled from said system, or maintained in solution in or mixed with said stored liquid. In another aspect, it relates to a process and apparatus in which a head of liquid is maintained in a zone above said discharging apparatus by a liquid level control which controls the passage of liquid from said stored liquid to said zone.

In the prior art, difficulties have been experienced in such processes and apparatus for storing volatile liquids or liquefied gases, in that liquid has been drawn into the vapor going to the compressor, causing the compressor to break because of being driven so as to attempt to compress the liquid; in that fixed gases and/or more difficultly condensable gases have tended to segregate in the upper portion of the stored liquid and to separate therefrom, causing an extra load on the compressor, instead of being bled off or retained mixed throughout the stored liquid; and in that by placing the valve controlled by the liquid level in the pump liquid head-supplying tank in the vapor line to the compressor (as in Wade 2,021,394 of November 19, 1935), the compressor could not be used for refrigerating the stored liquid, but could only be used for unloading.

The present invention solves these difficulties of the prior art, as will be explained more fully in the following specification, by providing means to keep liquid out of the compressor at all times, means to mix the more difficultly condensable or fixed gases with the entire mass of stored liquid so that they will not segregate, and means to control the liquid level in the pump head-supplying tank without interfering with the refrigeration cycle.

One object of the present invention is to provide a process and a system for volatile liquid or liquefied gas storage, refrigeration, and unloading which is efficient in each of these three functions.

Another object is to provide a process and system in which liquid is kept out of the compressors at all times.

Other objects are to provide a process and system in which segregation of more volatile constituents of the liquids being stored is reduced.

A further object is to provide a process and system in which the controls are such that the compressor used for unloading can also be employed for refrigeration.

Numerous other objects and advantages will be apparent to those skilled in the art upon reading the accompanying specification, claims, and drawings.

In the drawings:
FIGURE 1 is a cross-sectional view of a storage, refrigeration and unloading system for volatile liquids or liquefied gas embodying the present invention. This system is shown on a ship, where it finds its most valuable use.

Figure 1:
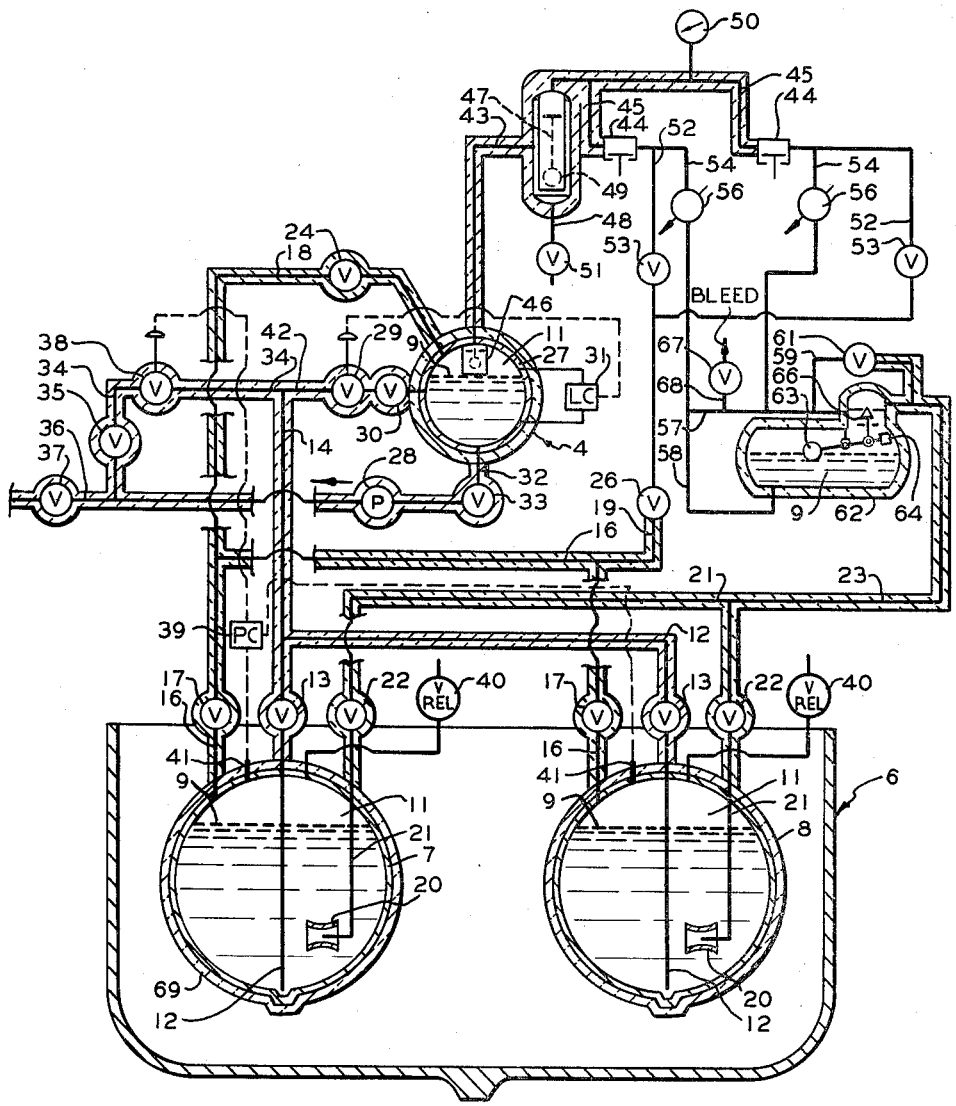

In FIGURE 1, the system embodying the present invention is generally designated as 4. While system 4 can be mounted on land, on a land vehicle, or in an aircraft, its present most valuable use is on a ship, generally designated as 6. Ship 6 is not modified from other conventional ships of the prior art in any way except by being a support for system 4.

A plurality of storage tanks 7 and 8 are suitably mounted (mountings not shown) in ship 6 to contain the volatile liquid or liquefied gas 9 and vapors 11 thereof. Each of tanks 7 and 8 is provided with a liquid loading and unloading line 12 extending preferably to the bottom of the tank, as liquid below the bottom of line 12 cannot be unloaded by the same, but has to evaporate or remain in the tanks. It is preferred to have it remain in the tanks unless the entire system is to be emptied for repair purposes. A shut-off valve 13 is provided in each line 12, and the lines are manifolded into line 14. Similarly, tanks 7 and 8 are provided with vapor lines 16 provided with shut-off valves 17 and manifolded into lines 18 and 19. The point of entry of lines 16 into tanks 7 and 8 is near the top of the tank, because they mark the upper limit for liquid storage. However, some vapor space 11 is necessary in the top of these tanks above liquid 9, as a sudden dangerous increase in pressure might occur if the tanks ever became liquid full. As one of the features of this invention, tanks 7 and 8 are also provided with a venturi sleeve 20 containing the discharge end of a fluid return line 21 containing a shut-off valve 22 manifolded to line 23.

Because lines 16 are connected to both lines 18 and 19, it is necessary to control the latter by shut-off valves 24 and 26, respectively.

Connected to tanks 7 and 8 by lines 16 and 18 is a receiver tank 27, which functions to supply a liquid head for unloading pump 28 when said pump is being used. Tank 27 is intended to normally contain liquid 9 with a vapor space 11 above the liquid, the liquid level operating shut-off valve 29 in response to liquid level control 31. Valve 30 is a shut-off valve.

Tank 27 has four connections, the first connection to line 18 preferably being near the top of the tank in vapor space 11, and the second connection to liquid unloading line 32 preferably being near the bottom of the tank below the controlled level of liquid 9. Unloading line 32 contains shut-off valve 33, unloading pump 28, and joins with loading line 34 to form service line 36 containing shut-off valve 37. Loading line 34 is controlled by shut-off valve 35 and pressure-responsive shut-off valve 38 which is closed by pressure control 39 whenever the pressure at 41 in either tank 7 or 8 reaches a predetermined maximum safe point below the relief pressure of relief valves 40. Obviously, if both valves 13 are opened during loading, thus equalizing the pressure in tanks 7 and 8, only one pressure transmitter 41 would be necessary; however, one transmitter for each tank is preferable for safety. Line 34 connects to both line 14 to tanks 7 and 8 and line 42 leading to tank 27 through valve 29. The third connection 42 to tank 27 may enter the tank anywhere between lines 18 at the top and 32 at the bottom. The fourth connection is a vapor line 43 which connects the vapor space 11 in tank 27 to line 45 leading to one or more compressors 44, and to insure that no liquid slugs will ever travel through line 45 into said compressors 44, line 43 is provided with a first float-controlled shut-off valve 46 and a second float-controlled shut-off valve 47. Although almost never opened, unless a complete shutdown occurs, a drain 48 for the bottom of float valve chamber 49 may be provided having a shut-off valve 51 for removing liquids if any should pass first shut-off valve 46 and close valve 47, which closing will be indicated by the pressure gage 50.

The discharged gases under pressure from compressors 44 during unloading may pass directly from said compressors through line 52 controlled by shut-off valves 53 through valve 26 into line 19, or when valves 53 are closed and valves 22 are open during loading and refrigeration, said compressed gases pass through lines 54 and condenser 56 in indirect heat exchange with a suitable cooling fluid into lines 57 and 58. At the start-up of the loading and refrigerating cycle, condensers 56 may fail to liquefy the gas in lines 54, and so the cooled gases pass through line 57 and by-pass line 59 controlled by open shut-off valve 61 into line 23. As some liquid is formed in condensers 56, it passes through line 58 into float valve chamber 62 raising float 63, lowering counter weight 64 and opening valve 66 so that liquid passes into line 23.

Valve 67 in vent stack 68 is left open when loading starts, and when the air and noncondensable gases are bled off to the extent deemed necessary valve 67 is almost closed for two days to continue bleeding off noncondensable gases, or until frost on line 68 downstream of valve 67 indicates that liquid is passing the valve, whereupon it is closed.

The following table tells which valves should be opened or closed at which times:

*Valve positions, FIGURE 1*

| Refrigerating | | | | Unloading | |
| --- | --- | --- | --- | --- | --- |
| Loading | | Storing | | | |
| Valve Numbers | | Valve Numbers | | Valve Numbers | |
| Open | Closed | Open | Closed | Open | Closed |
| 13 | | | 13 | 13 | |
| 17 | | 17 | | 17 | |
| 22 | | 22 | | | 22 |
| 24 | | 24 | | | 24 |
| | 26 | | 26 | 26 | |
| 29* | | 29 | | 29 | |
| | 30 | | 30 | 30 | |
| | 33 | | 33 | 33 | |
| 35 | | | | 35 | 35 |
| 37 | | | 37 | 37 | |
| 38* | | 38 | | 38 | |
| | 40* | | 40 | | 40 |
| 46* | | 46 | | 46 | |
| 47* | | 47 | | 47 | |
| | 51* | | 51 | | 51 |
| | 53 | 53 | | 53 | |
| 61 | | | 61 | | 61 |
| 67 | | | 67 | | 67 |

*Valve 29 is always on liquid level control.
Valve 38 is almost always open, except it closes on excess pressure in tanks 7 or 8, each a little below the pressure that will open relief valves 40.
Relief valves 40 open when the pressure in tanks 7 or 8 is excessive.
Valves 46 and 47 are almost always open, but will not pass liquid slugs, if such should occur.
Valve 51 is closed except when liquid collects in chamber 49 to a level closing valve 47, whereupon pressure gage 50 indicates a lowered pressure and valve 51 is opened until pressure is restored.
Valve 61 is open during loading until liquid reaches it and starts to form frost on the valve; then it is closed.
Valve 66 opens when liquid 9 raises float 63.
Valve 67 is opened when loading first starts and is almost closed when it is believed most of the noncondensable gases are vented. Then, after 2 days or when frost starts to form on pipe 68 downstream of this valve, it is closed completely.

In order to reduce the amount of power necessary for compressors 44 to supply sufficient refrigeration, a layer of heat-insulating material 69 is provided, disposed around all the parts in FIGURE 1 that need the same. No heat insulation is needed on compressor 44 or heat exchangers, pipes, and valves downstream of these compressors until valves 26, 61 or 62 are reached, so none is shown on them. As FIGURES 2 and 3 are merely enlarged views of portions of FIGURE 1, their heat insulation has been omitted to make them easier to understand.

Figure 2:
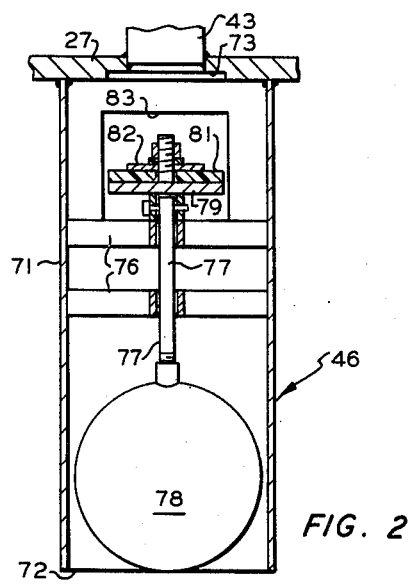
FIGURE 2 is an enlarged cross-sectional view of the first float valve in the line between the liquid head-supplying tank and the compressor in FIGURE 1.

FIGURE 2 shows details of construction of the first float valve 46 of FIGURE 1. It consists of a vertical sleeve 71 secured to the upper tank wall 27, preferably by welding, said sleeve being open at the bottom 72. A valve seat 73 is provided on wall 27 around outlet pipe 43. Guided in one or more spiders 76 is a valve stem 77 having a metal ball float 78 full of air mounted thereon at its lower end, and a metal valve seat 79, plastic gasket 81 and metal gasket retainer 82 mounted on its upper end. The valve head and gasket seal over seat 73 to close pipe 43 whenever liquid should lift float 78. A pair of openings 83 are provided in sleeve 71 near its upper end to allow gas to by-pass ball 78.

Figure 3:
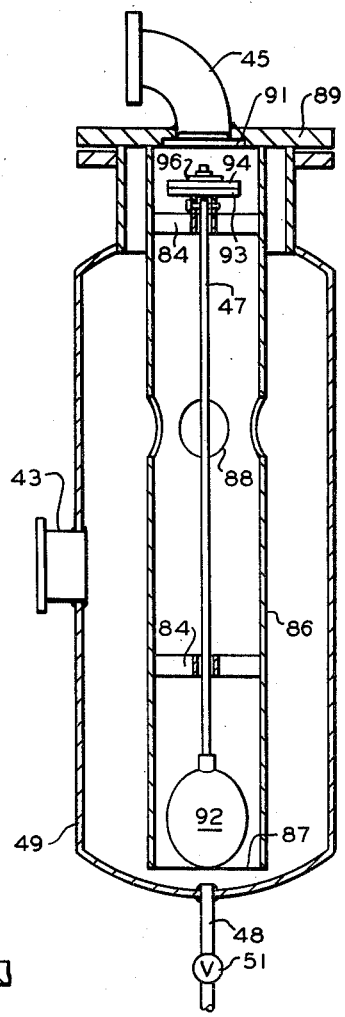
FIGURE 3 is a similar view of the second float valve in said line.

FIGURE 3 shows details of construction of the second float valve 49 of FIGURE 1, which consists of a housing 49 connected at the top to line 45, at the bottom to line 48, and at an intermediate point to line 43. A valve stem 47 is guided by spider 84 mounted in perforated cylindrical sleeve 86 having an open lower end 87 and side openings 88 for the passage of gas preferably above the inlet line 43. The top of sleeve 86 is preferably welded to cover plate 89 which is provided with a valve seat 91 surrounding pipe 45. Mounted on stem 47 is a hollow metal float ball 92 filled with air, and on the top end of stem 47 is mounted a valve head 93 with a plastic gasket 94 and retainer 96 which is disposed to rise and seal off pipe 45 at seat 91 when liquid enters chamber 49 and floats ball 92.

The operation of the system is as follows:

*Loading.*—Valves 13, 17, 22, 24, 29, 35, 37, 38, 46, 47, 61 and 67 are open and valves 26, 30, 33, 40, 51 and 53 are closed. Liquefied gas or volatile liquid flows from a source (not shown) into line 36 and through lines 34, 14 and 12 to fill tanks 7 and 8. If excessive pressure in tanks 7 or 8 occurs, pressure control 41, 39 closes valve 38, temporarily shutting off this flow. If the system contains air or other noncondensable gas, such as nitrogen, valve 67 is opened wide until the liquefied gas or its vapors have forced out most of it, and then valve 67 is almost closed for either two days or until frost appears on line 68 downstream of valve 67, whereupon valve 67 is closed. Compressors 44 are started up, being driven by any suitable motors (not shown). Compressors 44 reduce the pressure in space 11 and the liquid in tanks 7 and 8 boils, the vapors passing through lines 16 and 18 into space 11 and through lines 43 and 45 to compressors 44. Liquid cannot pass because of float valves 46 and 47. The compressed gas in lines 54 is condensed by cooling in heat exchangers 56, cooled by air or sea water (not shown). The condensed liquid passes into valve chambers 62, raising pivoted float 63, opening valve 66. When valve 66 opens, frost should be forming on valve 61, which is then closed. The liquid passing valve 66 (or 61 when open) goes into pipe 23 at a lower pressure and some of it evaporates into gas, thereby absorbing heat, the resulting gas and liquid becoming very cold. This cold gas and liquid returns to tanks 7 and 8 where it enters venturi sleeves 20 causing circulation of liquid in these tanks. This forced circulation acts to reduce the tendency for different boiling point liquids to segregate in layers in these tanks, and it also tends to reduce the vapor pressure in these tanks by keeping the more volatile products dissolved in the less volatile products. As is well known, the commercial methane, ethane, propane, butane, pentane, ammonia, gasoline, or like volatile liquids are not pure, but contain higher or lower boiling impurities. LP Gas, LPG, or liquid petroleum gas is often a mixture of over 10 percent of propane or butane with the remainder being the other hydrocarbon plus measurable amounts of ethane and pentane. As it is all fuel and all burns, purity is not essential, and therefore segregation and separation of higher vapor components is to be avoided in order to keep the vapor pressure in tanks 7, 8 and 27 down to values not more than 20 pounds per square inch gage. Otherwise, the tanks would have to be made of heavier metal, which would be expensive and add to the weight of the ship, if the tanks are on a ship 6.

*Storing.*—When loading is completed, line 36 is disconnected from the source of liquid (not shown), valves 17, 22, 24, 29, 38, 46 and 47 are opened, or remain open, and valves 13, 26, 30, 33, 35, 37, 40, 51, 53, 61 and 67 are closed, or remain closed. Refrigeration with compressors 44 continues.

*Unloading.*—When the time for unloading arrives line 36 is connected to the pipe (not shown) to which the liquid is to be transferred, valves 13, 17, 26, 29, 30, 33, 37, 38, 46, 47 and 53 are opened, or remain open, and valves 22, 24, 35, 40, 51, 61 and 67 are closed or remain closed. Pump 28 is started up (its motor is not shown) and unloading starts. If the vapor pressure in space 11 in tanks 7 and 8 builds up too high, as indicated by pressure control 39, then valve 26 may be partially closed and valves 22 partially opened, so that some of the hot compressed vapor from compressors 44 goes directly to tanks 7 and 8, but some is cooled and condensed in coolers 56 and goes through valves 66 and 22 to refrigerate tanks 7 and 8 and lower the excessive pressure therein.

Pump 28 is running liquid-full because of the head of liquid above it in receiver 27. As the liquid level in 27 is pumped down, valve 29 is opened by liquid level control 31 and more liquid comes into tank 27 being forced by gas pressure from compressors 44 and lines 52, 16 and 17 to pass through pipes 12, 14 and 42 to keep a hydraulic head over pump 28. Vapor in space 11 is evacuated by compressors 44 and passes hot from them through valves 53, by-passing coolers 56 through valve 26 and lines 19 and 16 into the top of tanks 7 and 8, where its pressure aids in forcing liquid up lines 12 through tank 27 to pump 28 and on out of the ship through line 36 and valve 37, to a tank on shore (not shown), or to whatever the liquid is being dispensed.

While a specific example has been shown in the drawings for illustrative purposes, it is believed obvious this invention is not limited thereto.

Having described my invention, I claim:

1. In a system for storing liquefied normally-gaseous material, comprising a mixture of gases, in a refrigerated condition at a temperature substantially below atmospheric temperature, and thereby at a substantially reduced pressure, comprising in combination a storage tank having an upper vapor withdrawal line, a compressor having an inlet connected to said vapor withdrawal line and an outlet connected with a condenser, and a return line connecting said condenser with said tank, the improvement comprising a venturi sleeve with its axis substantially horizontal disposed in said tank below the normal loaded liquid level, and with the discharge end of said return line disposed to discharge liquid and remaining gases from said condenser axially into said venturi sleeve.

2. A loading, storing, and unloading system for storing liquefied normally-gaseous material in a refrigerated condition at a temperature substantially below atmospheric temperature and thereby at a substantially reduced pressure, comprising in combination:
a storage tank for said liquefied gas;
a receiver tank disposed above said storage tank;
a gas compressor having an inlet and an outlet;
a liquid pump having an inlet and an outlet disposed below said receiver tank;
a first line for liquid connecting the bottom of said storage tank with said receiver tank;
a first valve controlling flow through said first line;
a liquid level control responsive to liquid level in said receiver tank disposed to open said first valve when said liquid level falls below a predetermined point and to close said first valve when said liquid level rises above a predetermined point;
a second line for discharging liquid connecting the bottom of said receiver tank with the inlet of said pump;
a third line for vapor withdrawal connecting the top of said receiver tank with the inlet of said compressor;
a fourth transfer line connecting the outlet of said compressor with said storage tank;
a fifth line for liquid loading connected to said storage tank;
a sixth vapor line connecting the top of said storage tank with the top of said receiver tank;
a second valve in said sixth line adapted to be closed during unloading said storage tank;
and a third valve in said fifth line adapted to be opened during loading said storage tank;
whereby said compressor can be run during loading, storing, and unloading said storage tank.

3. The combination of claim 2 with a condenser having an inlet and an outlet connected as a part of said fourth line for use during loading and storage to provide refrigeration.

4. The combination of claim 3 with pressure reducing means connected in said fourth line between said condenser and said storage tank disposed to cause evaporation of liquid to cool said storage tank.

5. The combination of claim 3 with at least one liquid float check valve connected in said third line to positively prevent slugs of liquid entering the inlet of said compressor.

6. The combination of claim 3 with a pressure controller responsive to pressure in said storage tank, and a shut-off valve in said fifth line, said pressure controller closing said shut-off valve when a predetermined pressure is reached in said storage tank.

7. The combination of claim 3 with a venturi sleeve disposed horizontally below the normal loaded liquid level in said storage tank, and with the end of the fourth line extending into said sleeve axially thereof and disposed to discharge a jet therein inducing circulation and mixing in said storage tank.

8. A loading, storing, and unloading system for storing liquefied normally-gaseous material in a refrigerated condition at a temperature substantially below atmospheric temperature and thereby at a substantially reduced pressure, comprising in combination:
a storage tank;
means to load said storage tank with liquefied gas;
a receiver tank above said storage tank;
a pump below said receiver tank;
means to move liquid from said storage tank to said receiver tank;
means, separate from said last-mentioned means, to exhaust vapor from said storage tank, compress and condense said vapor to liquid, and return said liquid to said storage tank to refrigerate the same; and
means to withdraw liquid from said receiver tank to said pump to unload said storage tank while liquid is transferred to said receiver tank from said storage tank by said means to move liquid from said storage tank to said receiver tank.

9. A process of unloading a liquefied normally-gaseous material from a storage tank through a receiver tank above said storage tank and a pump below said receiver tank, comprising the steps of drawing liquid from the bottom of said storage tank into said receiver tank through a valve controlled by the liquid level in said receiver tank to maintain a predetermined liquid level hydraulic head above said pump by withdrawing vapor from said receiver tank, compressing said vapor, returning a first regulated portion of said compressed vapor to said storage tank, returning a second regulated portion of said compressed vapor after cooling and condensing same to a liquid to said storage tank, and pumping the liquid out of said receiver tank with said pump.

10. An unloading system for unloading liquefied normally-gaseous material stored in a refrigerated condition at a temperature substantially below atmospheric temperature and thereby at a substantially reduced pressure, comprising in combination:
- a storage tank;
- a receiver tank above said storage tank;
- a pump below said receiver tank;
- means to move liquid from said storage tank to said receiver tank comprising a conduit connecting the bottom of said storage tank with said receiver tank, a valve controlling flow through said conduit, and a liquid level control connected to said receiver tank and said valve to close said valve when a predetermined liquid level is obtained in said receiver tank;
- means to exhaust vapor from said receiver tank and to compress said vapor; means for returning a first regulated portion of said compressed vapor without cooling to said storage tank; means for cooling and condensing a second regulated portion of said compressed vapor to liquid and returning said liquid to said storage tank;
- and means to withdraw liquid from said receiver tank to said pump to unload said storage tank while liquid is transferred to said receiver tank from said storage tank by said means to move liquid from said storage tank to said receiver tank.

11. A storing and unloading system for storing liquefied normally-gaseous material in a refrigerated condition at a temperature substantially below atmospheric temperature and thereby at a substantially reduced pressure, and for unloading said liquefied material rapidly, comprising in combination:
- a storage tank for said liquefied material;
- a receiver tank disposed above said storage tank;
- a gas compressor having an inlet and an outlet;
- a liquid pump having an inlet and an outlet disposed below said receiver tank;
- a first line for liquid connecting a lower portion of said storage tank with said receiver tank;
- a second line for vapor connecting an elevated portion of said storage tank with an elevated portion of said receiver tank;
- a third line connecting a lower portion of said receiver tank with the inlet of said pump;
- a fourth line connecting an elevated portion of said receiver tank with the inlet of said gas compressor;
- a fifth line connecting an elevated portion of said storage tank with the outlet of said gas compressor;
- a sixth line connecting the outlet of said gas compressor with said storage tank;
- means for closing said first line during storage and opening it during unloading;
- means for opening said second line during storage and closing it during unloading;
- means for closing said third line during storage and opening it during unloading;
- means for not operating said pump during storage and means for operating it during unloading;
- means for closing said fifth line during storage and opening it during unloading;
- means for opening said sixth line during storage and closing it during unloading;
- indirect heat exchange cooling means in said sixth line with sufficient capacity to condense liquid from the compressed gaseous material from said gas compressor; and
- means in said sixth line downstream of said cooling means to release said condensed liquid at reduced pressure to said storage tank during storage to refrigerate the same.

12. A process of storing in, and unloading from, a storage tank a liquefied normally-gaseous material, comprising the steps of gathering vapor from said liquid in said tank compressing said vapor, cooling and condensing said vapor to liquid, releasing said liquid at reduced pressure to said tank to produce refrigeration during storage, returning during unloading a first regulated portion of said compressed vapor directly to said tank without cooling and condensing to liquid to aid said unloading by increasing the pressure in said tank during unloading and returning a second regulated portion of said compressed vapor after cooling and condensing to a liquid to said storage tank, the amounts of said regulated portions being determined in accordance with said pressure in said storage tank.

References Cited by the Examiner

UNITED STATES PATENTS

| | | | |
|---|---|---|---|
| 1,371,427 | 3/21 | Kerr | 62—54 |
| 1,968,504 | 7/34 | Rufener et al. | 62—54 |
| 2,021,394 | 11/35 | Wade | 62—55 |
| 2,346,253 | 4/44 | De Motte | 62—54 |
| 2,796,739 | 6/57 | Meade et al. | 62—55 |
| 2,959,928 | 11/60 | Maker | 62—54 |
| 2,993,344 | 7/61 | Reed | 62—55 |
| 3,098,362 | 7/63 | Sohda et al. | 62—54 |
| 3,106,827 | 10/63 | Schlumberger | 62—55 |

ROBERT A. O'LEARY, *Primary Examiner.*